United States Patent
Mathias et al.

[11] 3,745,314
[45] July 10, 1973

[54] CAVITY IDENTIFICATION

[75] Inventors: Benny B. Mathias, Maumee; James R. Sager, Toledo, both of Ohio

[73] Assignee: Owens-Illinois, Inc., Toledo, Ohio

[22] Filed: June 18, 1971

[21] Appl. No.: 154,473

[52] U.S. Cl............ 235/61.11 E, 65/29, 209/72, 235/61.12 N, 250/223 B
[51] Int. Cl..... G06k 7/12, G01n 21/32, C03b 9/32, G06m 7/04, B07c 5/342
[58] Field of Search.............. 65/242, 375, 158, 65/29; 235/61.12 R, 61.12 N, 61.11 E, 61.11 R; 209/72; 250/223 B, 219 D; 356/240

[56] References Cited
UNITED STATES PATENTS

| | | | |
|---|---|---|---|
| 3,601,616 | 8/1971 | Katsumata | 250/223 B |
| 3,356,853 | 12/1967 | Rottmann | 356/240 |
| 3,533,704 | 10/1970 | Krenmayr | 356/240 |
| 3,529,167 | 9/1970 | Calhoon | 356/240 |
| 3,301,396 | 1/1967 | Benson | 209/72 |
| 3,111,576 | 11/1963 | Lipschutz | 235/61.11 E |
| 3,585,367 | 6/1971 | Humbarger | 235/61.11 E |
| 3,409,760 | 11/1968 | Hamisch | 235/61.12 N |
| 3,418,456 | 12/1968 | Hamisch | 235/61.11 E |
| 3,415,370 | 12/1968 | Husome | 65/29 |

Primary Examiner—Maynard R. Wilbur
Assistant Examiner—R. Kilgore
Attorney—D. T. Innis et al.

[57] ABSTRACT

Apparatus and method for determining which of a plurality of molds produced a particular bottle and a bottle coded in a manner suitable for identification by the apparatus of the invention. A non-digital identification code is molded into a bottle while it is formed in a mold. As a preferred embodiment, the code is an octal code imposed as a series of protuberances in the bottom of a glass container. The bottle is presented at an identification station, and the image of the identification indicia is optically rotated past a reader while the bottle is held stationary. By use of suitable logic and read-out electronics, the mold number of a bottle may be displayed as a digital number and all bottles from a selected mold may be rejected.

10 Claims, 8 Drawing Figures

Patented July 10, 1973
3,745,314
4 Sheets-Sheet 1
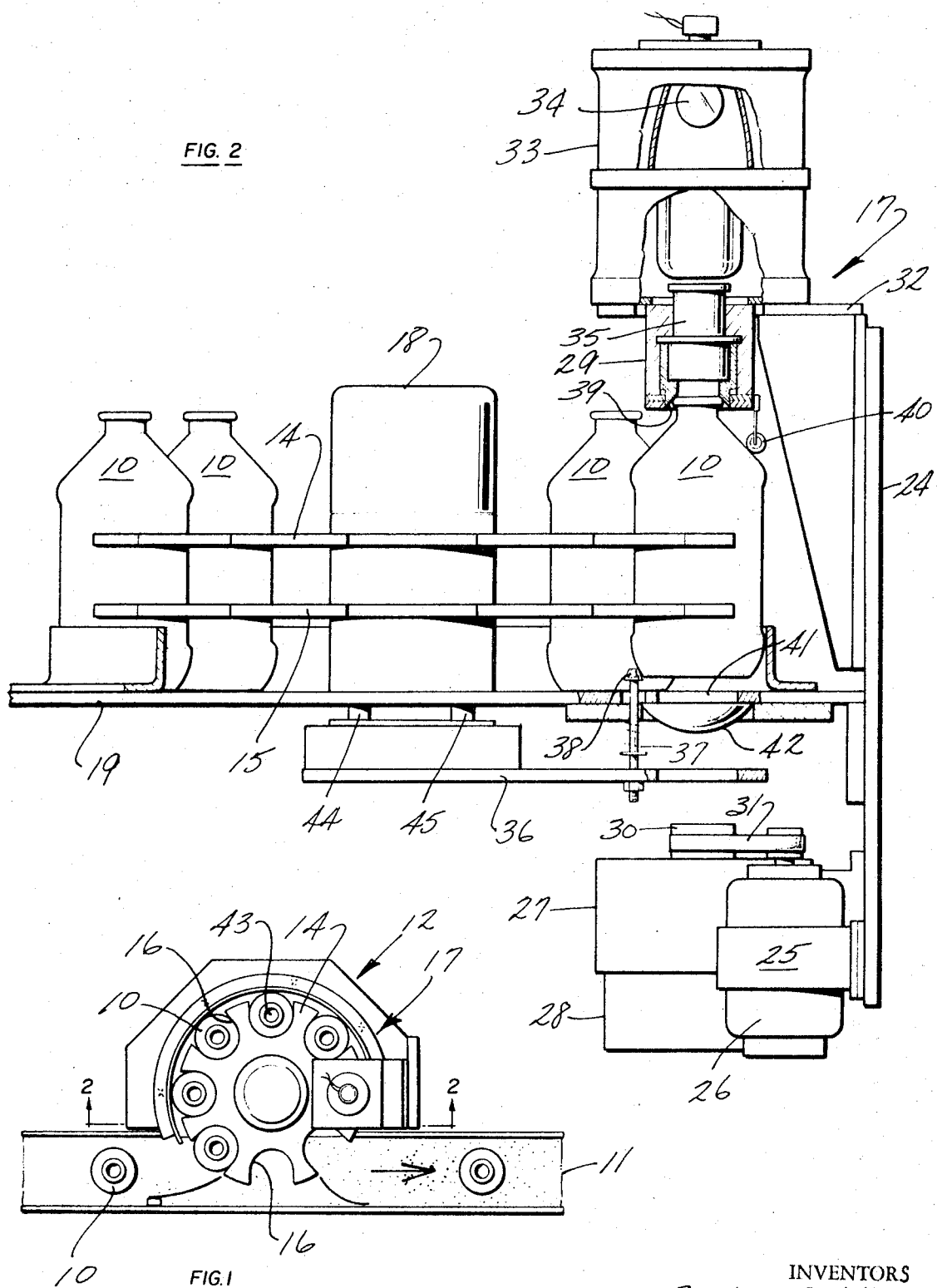
INVENTORS
BENNY B. MATHIAS
BY JAMES R. SAGER
ATT'YS.

Patented July 10, 1973

INVENTORS
BENNY B. MATHIAS
BY JAMES R. SAGER
ATT'YS.

Patented July 10, 1973

INVENTORS
BENNY B. MATHIAS
BY JAMES R. SAGER

ATT'YS.

Patented July 10, 1973 3,745,314

CAVITY IDENTIFICATION

BACKGROUND OF THE INVENTION

It is well known in the bottle making art that many defects are cavity oriented. That is, a particular mold, of a plurality of molds, will tend to continue to produce a particular defect once the conditions are present to create the defect. It is thus necessary to determine which mold out of multiple molds is producing a defective bottle so that corrective measures may be taken. To this end, it is a common practice to mold into the bottom of containers a digital representation of the mold of origin; i.e., a bottle produced by mold number 7 will have a small numeral 7 molded into the bottom of the bottle. However, such markings are not readily readable by electronic means and require that each bottle be picked up to read the number. If each bottle from a particular mold is to be discarded, a person must memorize the complex pattern in which a particular mold's products will be distributed across the width of an annealing lehr and discard bottles based on this pattern. As may be appreciated, this procedure frequently results in the discard of some good bottles while allowing defective ones to pass, since confusion as to the pattern is common.

DESCRIPTION OF PRIOR ART

U.S. Pat. No. 3,301,396 teaches one method of electrically reading the number of the mold which produced a particular bottle. In particular, the patent teaches the use of rotating electrical switches to detect the presence of projections or "bumps" molded into the bottom of a container. However, the method therein disclosed is limited as to the number of molds which may be identified, since each "bump" that is measured is counted as 1, the total number of bumps being added to obtain the mold number. It should be clear that the number of individual molds which may be identified is thus sharply restricted by the number of bumps which can be placed in the bottle bottom. Furthermore, the "reading" device is a rotating mechanical switch array which must contact the bottle surface. This is undesirable since contact with a bottle is generally to be avoided, if possible, to eliminate the possibility of imparting surface scratches which can initiate failure of pressurized bottles. The present invention overcomes all of these problems.

SUMMARY OF THE INVENTION

This invention relates to a method and apparatus for identifying containers made in any of a plurality of molds by the optical scanning of the image of the bottom of the containers, with the container bottoms carrying identifying indicia molded therein and to containers made with such indicia.

BRIEF DESCRIPTION OF THE DRAWINGS

FIG. 1 is a top plan view of the apparatus of the invention;

FIG. 2 is a sectional view, on an enlarged scale, taken at line 2—2 of FIG. 1;

Figure 3:
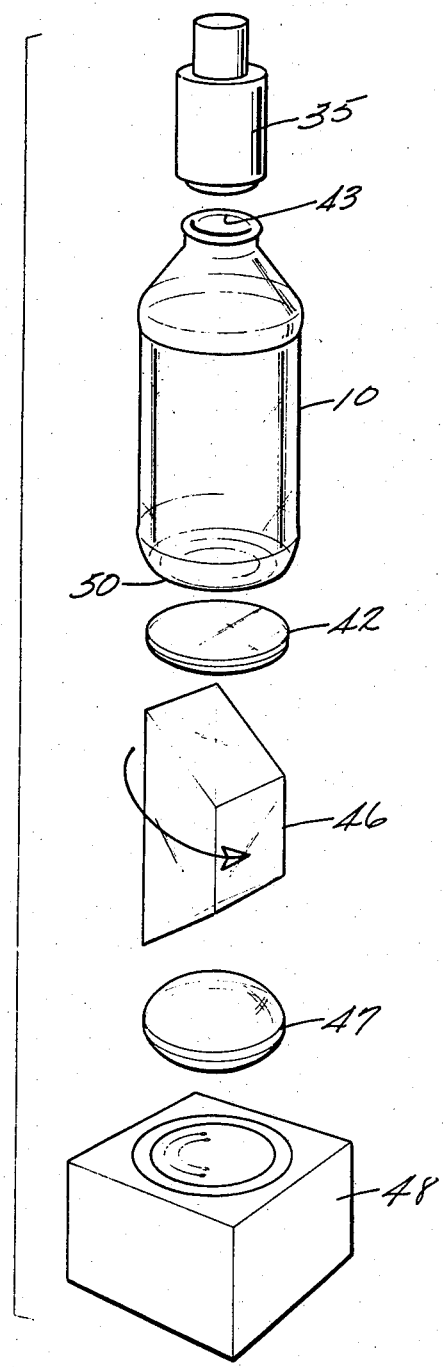
FIG. 3 is an exploded view of the optical system of FIG. 2.

This invention relates to a method of and apparatus for determining which of a plurality of molds produced a pariticlar object. More particularly, this invention relates to the identification of the mold of origin of glass bottles. Each of a plurality of molds is provided with a unique identification indicia. This indicia is impressed into every product of this mold in the form of a non-digital representation, preferably in octal code, but the code may be a natural binary. The reason for choosing an octal coding will be discussed in detail later. The product of the mold, a glass bottle in the preferred embodiment, will have the coded indicia impressed in its bottom area in the form of small integrally molded protuberances. The bottles are conveyed to an inspection station where the mold indicia are read, one at a time, for each bottle. The reading is accomplished in the following manner: The bottle is held stationary and a beam of light is directed through the upper portion to uniformly illuminate the bottom of the container which contains the coded information. The image of the bottom, appearing as dark spots where the coding protuberances reflect the light, is directed through a rotating dove prism onto a reading device. The reading device has photocells which are responsive to the dark spots. The rotating dove prism causes the image of the bottom to be rotated on the plane of the reading device, thus bringing the dark spots past the fixed photocells. Suitable electronic circuitry is then provided to decode the pattern of dark spots and present the mold number of a bottle in the station as a digital output. There are also provided photocells sensitive to the general level of ambient light falling on the reading device. These photocells control the reading photocells so that changes in ambient light levels will not cause errors in reading the projected encoded intelligence impressed into the bottle bottom.

The identification numbers will normally be two digit numbers (which, of course, includes 0–9). To this end, the identification indicia are in two groups, the first group of three being the tens and the second group of three being the units.

If a natural binary bode were used, a four stage shift register would be needed to obtain all of the numbers from 0 to 9 in both the tens and units places. However, this system is wasteful, since a 4 stage natural binary register can actually count to 15 (1 + 2 + 4 + 8), there thus being a waste of storage if the register is used to count a maximum of 9. Thus, an octal system was adopted for this identification device. This requires only a three stage shift register for both the units and the tens. The octal count is limited in that the numbers 8 and 9 are not available. Thus, no cavity number may start or end with 8 or 9, but this still allows the identification of 64 individual cavities by the use of a six stage shift register.

With particular reference to the drawings, the physical details of the invention will be described.

As may be seen in FIG. 1, containers 10, moving in the direction indicated, are presented by a conveyor 11 one at a time to an inspection device 12. The inspection device 12 is of a type well known in the art, such as that shown in U.S. Pat. No. 3,313,409 issued Apr. 11, 1969. Thus, the multiple inspection heads normally mounted on inspection device 12 are not shown in FIG. 1, such inspection heads forming no part of the present invention. Two spaced-apart, rotatably mounted discs 14 and 15 (best seen in FIG. 2) are provided with pockets 16 which serve to trap the containers 10. The discs 14 and 15 are rotated by an intermittent drive (not shown) to progressively move the containers 10 through a series of inspection positions. A cavity identification unit 17 is shown mounted at the last station before the containers 10 are returned to the conveyor 11. While the cavity identification device 17 is shown in conjunction with the inspection device 12 in this preferred embodiment, the apparatus of the cavity identification device 17 could be successfully utilized independently of the specific inspection device 12, the only criteria being that the containers are presented to the device 17, one at a time.

Turning now to FIG. 2, the discs 14 and 15 are mounted on a rotatable central hub 18. As the containers 10 are moved under the influence of the discs 14 and 15, they are slid over a fixed plate 19. The multiple elements which make up the cavity identification unit 17 may be clearly seen in FIG. 2. An elongated vertical support plate 24 which is attached to the fixed plate 19 serves to carry a motor mount 25 attached at its lower extremity. A drive motor 26 is held by the motor mount 25. Also attached to the lower portion of the support plate 24 is a rotating prism, support housing 27, which in turn has a read-out housing 28 suspended from its lower portion. A rotatably mounted tube 30 extends above the top of the prism housing 27 and is rotated by the motor 26 through a drive belt 31. A dove prism 46 (see FIG. 3) is mounted in the tube 30 which is rotatably supported in the prism housing 27. Attached to the upper portion of the vertical support plate 24 is a support bracket 32 which serves to support a light housing 33. Contained within the light housing 33 are a light source 34 and a lens system 35. As a container 10 is moved into the inspection station wherein the cavity identification unit 17 is mounted, a reciprocating arm 36 is raised by operation of the shafts 44, 45 by mechanism carried within the central hub 18 into the position shown in FIG. 2. The arm 36 carries three centering pins 37 (only one of which is shown in FIG. 2), each of which has a tapered heel-engaging lug 38 on its tip. The container 10 is lifted from the fixed plate 19 by the three tapered centering lugs 38 into a tapered recess 39 formed in the downwardly extending boss 29 of the light housing 33. The net effect is to center the container 10 with respect to the light path from the light source 34 to a read-out unit 48 located within the read-out housing 28. Raising the container 10 also trips a switch controlled by a switch roller 40, thereby starting the identification sequence. Light is directed axially through the container opening 43 and through the bottom of the container 10. After passing out of the container, the light passes through an opening 41 in the fixed plate 19, through a focusing lens 42 mounted on the fixed plate 19 under the opening 41 and then into the dove prism 46 and finally onto the read-out unit 48.

The light path just described may be seen more clearly by reference to FIG. 3 where the various elements are shown removed from their housings. The light source 34 is omitted in FIG. 3, it being understood that the light from this source 34 will be directed by the lens system 35 through the container opening 43 and thence out the bottom of the container 10. The lens 42 will direct the light exiting from the bottom of the container 10 into the rotating dove prism 46. The dove prism 46 is of the type well known in the art which will, when rotated, rotate any image directed through it. Thus, the image of the bottom of the container 10 will be directed through the focusing lens 47 and rotated on the read-out unit 48. Both the dove prism 46 and the focusing lens 47 are carried within the rotating prism housing 27.

Figure 4:
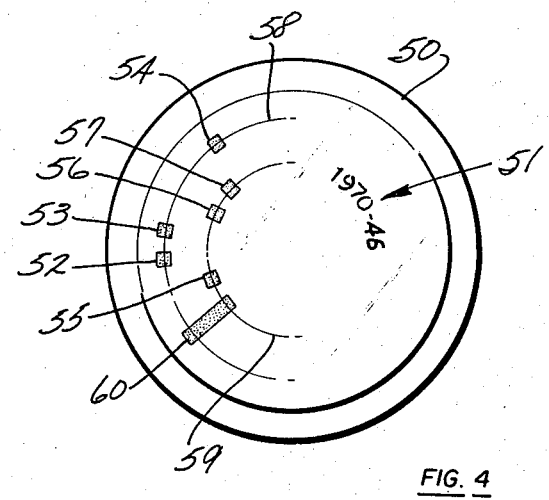
FIG. 4 is a bottom view of a container showing the identifying indicia.

FIG. 4 is a view of the bottom 50 of the container 10. A digital representation of the year of manufacture and mold of origin 51 is molded into the container bottom 50 to aid in manual identification of the container by those persons unable to read the machine readable identification markings. The machine readable markings are six molded in protuberances 52, 53, 54, 55, 56 and 57. These protuberances are so formed as to reflect and refract light shined on them so as to present dark spots in a projected image of the container bottom 50. It will be noted that the protuberances are arrayed about the circumference of two imaginary concentric circles 58 and 59. It may also be seen that a seventh protuberance 60 extends across both circles 58 and 59. The rotation of the image of the container bottom 50 on the read-out unit 48 is counter-clockwise and the protuberance 60 serves as a "start read" signal to the electronic circuitry, as will be explained later.

Figure 5:
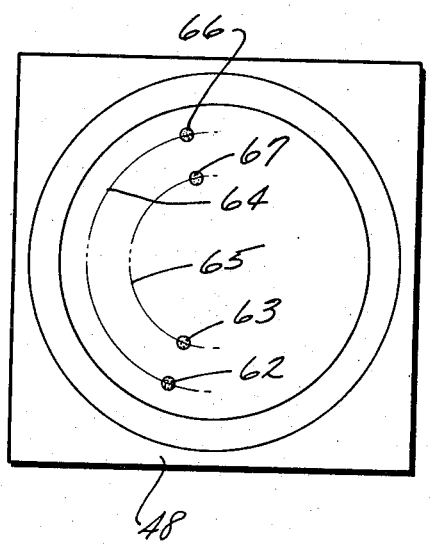
FIG. 5 is a top plan view of the photocell read-out device.

FIG. 5 is a top view of the read-out unit 48. The image of the container bottom 50 is rotated about the plane of the top surface of the read-out unit 48. Two read-out photocells 62 and 63 are positioned on imaginary concentric circles 64 and 65, corresponding to the circles 58 and 59 of the container bottom 50. Thus, the dark spots resulting from the protuberances 52, 53, 54, 55, 56, 57 and 60 will be rotated past the photocells 62 and 63 and their presence sensed by the photocells 62 and 63. Two balancing photocells 66 and 67 are also located on the circles 64 and 65, but are separated from the read photocells 62 and 63. The photocells 66 and 67 are not used to sense the presence of protuberances in the container bottom 50, but serve a system balancing function to be explained later with respect to FIG. 6.

Figure 7:
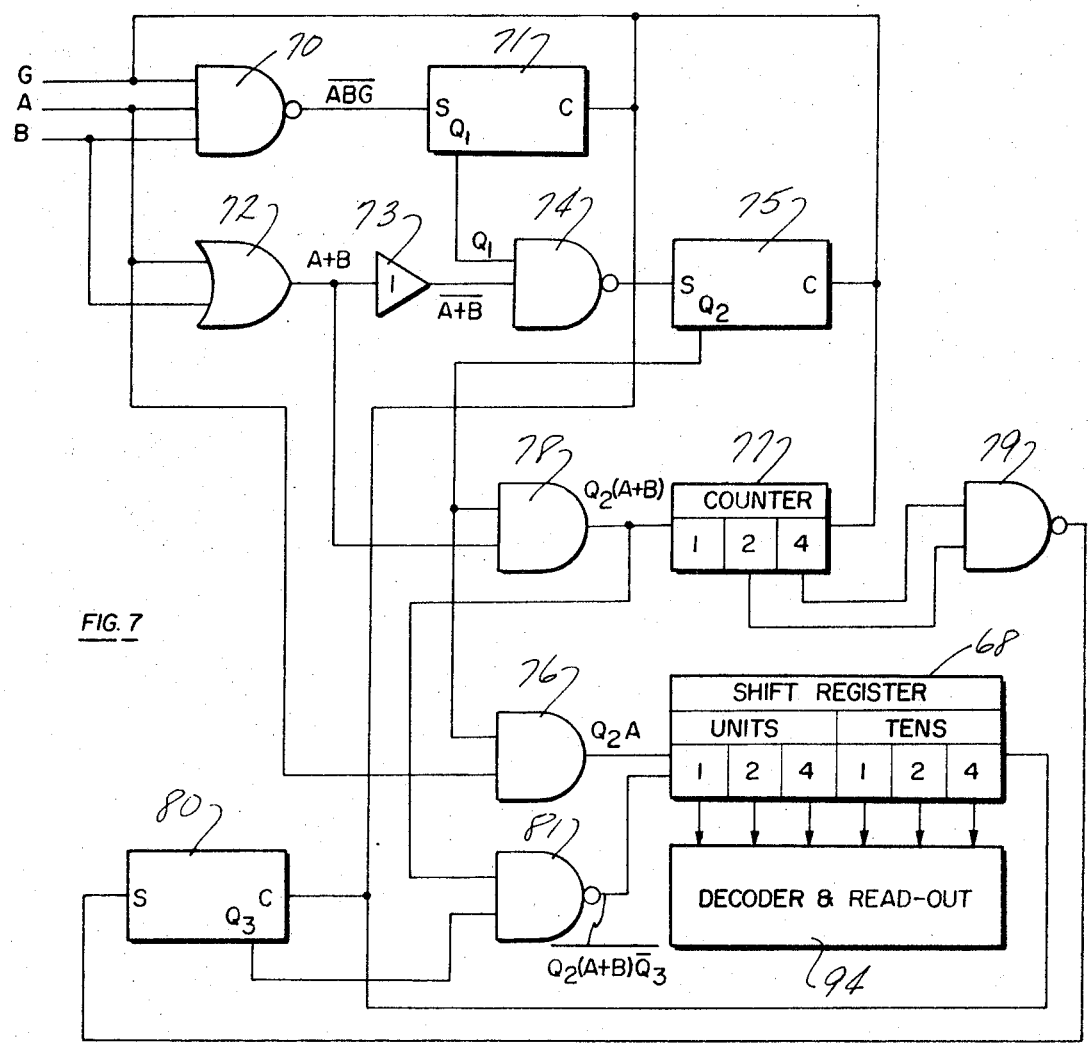
FIG. 7 is a schematic circuit diagram of the electronic system for reading and decoding the identifying indicia.
Figure 8:
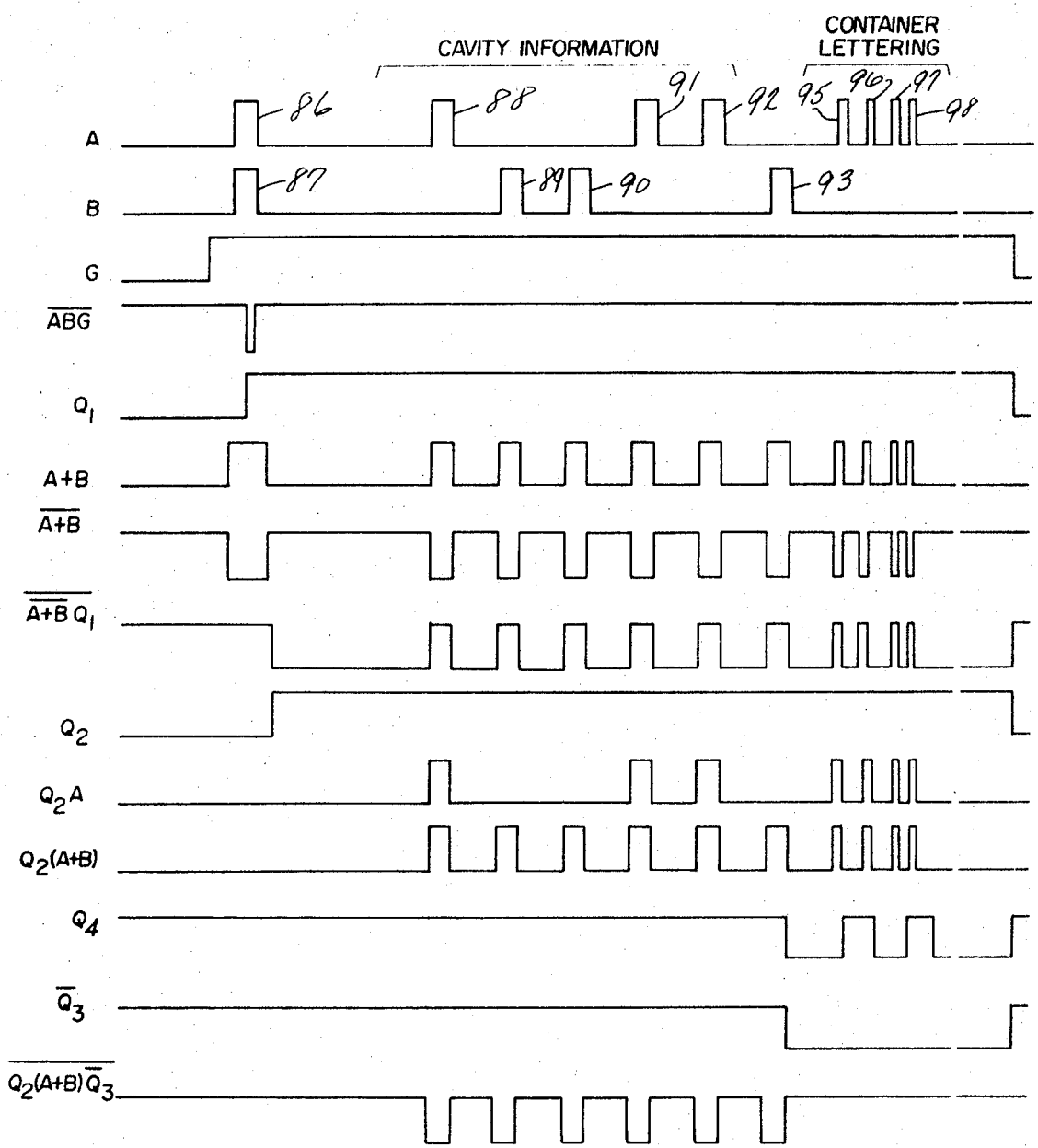
FIG. 8 is a time scale drawing of the wave forms of signals appearing at various points in the circuit of FIG. 7.

FIGS. 7 and 8 must now be considered together to explain the cavity identification sequence. The mold cavity number is always coded on the inner circle 59 in an octal code. The octal code was chosen for convenience, but natural binary coding could be used. "Not data" protuberances are always coded on the outer circle 58 and are used as a clocking code to help operate a shift register 68. The shift register 68 is designed to hold an octal representation of the decimal cavity number. Three stages of the shift register 68 are used to hold the decimal number in the units place and three stages will hold the decimal number in the tens place. Using the coded cavity number shown on the container bottom 50 in FIG. 4, the counting sequence is as follows: The first protuberance 55 is on the data circle 59, so a pulse will be entered in the 1 stage of the units place in the shift register. The next two protuberances 52 and 53 are not cavity data, but they will, in sequence, cause the initial pulse to be shifted to the 4 stage in the units place, leaving the 1 and 2 stages off. The next two protuberances 56 and 57 are data pulses. Again, every position in the shift register 68 will be moved one place by these protuberances causing pulses. The state of the shift register 68 at this point will be such that the 2 stage, in the tens place will be on, the 1 stage in the tens place will be off, 4 stage in the units place will be off, and the 1 and 2 stages in the units place will be on. The final protuberance 54 is again a not data signal and will give a final configuration of the shift register such that the 1 and 2 stages of the tens place will be off and the 4 stage will be on. The 2 and 4 place of the units place will be on and the 1 place of the units place will be off. Adding the decimal values of the "on" stages in both the tens and units places, as is the practice in binary or octal counting, gives a decimal number of 46 (4 + 0 + 0 and 4 + 2 + 0).

The waveform G is generated by the switch controlled by the switch roller 40. This indicates that a container 10 is in position for gauging. The cavity information data on circle 59 is represented by waveform A and the not data information on circle 58 is shown by waveform B. In the following discussion, conventional Boolian Algebra notation is used, for example, $\overline{AB}$ representing the function not A and B. When the start read protuberance 60 passes the two read photocells 62 and 63, the waveforms G, A and B are all in a high or on state. These 3 signals are passed by a NAND gate 70 to a flip flop 71. The signal $\overline{ABG}$ turns on the flip flop 71 whose output gives the waveform $Q_1$. The signals A and B are also sent to an Or gate 72 to give the waveform A + B. This is in turn inverted by amplifier 73 to give the waveform $\overline{A + B}$. The signals represented by waveforms $Q_1$ and $\overline{A + B}$ are fed into a NAND gate 74 and are then used to turn on a flip flop 75 at S to give a waveform $Q_2$ as an output from the flip flop 75. Both $Q_2$ and A (data) are introduced to an AND gate 76 which serves as the data in-put to the shift register 68. An information pulse will be fed into the shift register 68 only when there is a pulse in the A waveform. The waveforms A + B and $Q_2$ are used to operate a three stage binary counter 77 through an AND gate 78. When the count of 6 has been reached in the binary counter 77 (it being recalled that the information is always contained in six pulses), the counter output will be fed through a NAND gate 79 to give a waveform $Q_4$ which will switch a $\overline{Q_3}$ waveform signal output of a flip flop 80 from the on to the off state. In the on state, the waveform $\overline{Q_3}$ and the waveform $Q_2$ (A + B) are fed through a NAND gate 81 to give the waveform $\overline{Q_2 (A + B) \overline{Q_3}}$ which is the clock input to the shift register 68.

The first two pulses 86 and 87 in the waveforms A and B serve to set the system to receive information by turning on the flip flops 71 and 75. The pulse 88 is a data pulse in waveform A and turns on the 1 stage in the shift register 68 units place. The next two pulses 89 and 90 are not data pulses. These pulses thus are not fed into the shift register 68 but merely operate the clock NAND gate 81 which shifts the position of the information in the shift register 68 one stage for each pulse. Thus, at this stage, the 1 and 2 stages of the units place are off, and the 4 stage is on. The next two pulses 91 and 92 are data pulses. In addition to feeding the clocking NAND gate 81, these pulses also go through the shift register input AND gate 76 and turn on two more stages of the shift register 68. The condition of the shift register now is shown in Table 1.

| UNITS | | | TENS | | | |
|---|---|---|---|---|---|---|
| 1 | 2 | 4 | 1 | 2 | 4 | Table 1 |
| ON | ON | OFF | OFF | ON | | |

The final pulse 93 of the six information pulses is in waveform B and is thus a not data pulse. This operates the clocking NAND gate 81 to give a final shift register configuration as shown in Table 2.

| UNITS | | | TENS | | | |
|---|---|---|---|---|---|---|
| 1 | 2 | 4 | 1 | 2 | 4 | Table 2 |
| OFF | ON | ON | OFF | OFF | ON | |

Several events occur with the sensing of the final information pulse 93. The shift register 68 is read by the decoder and read-out unit 94 which then presents the previously octal information in a decimal form using conventional decimal number display tubes. The final pulse 93 also causes the binary counter 77 to reach its pre-set limit and switch the waveform $\overline{Q_3}$ to an off state. With the wave form $\overline{Q_3}$ off, the shift register 68 can no longer receive information since the clock waveform $\overline{Q_2 (A + B) \overline{Q_3}}$ is dependent upon a $\overline{Q_3}$ input to the NAND gate 81. Thus, the pulses caused by the digital container lettering 51 (shown as pulses 95, 96, 97 and 98 in waveform A) will not cause a change in the count recorded by the shift register 68. When the container 10 is lowered for removal from the inspection device 12, the switch roller 40 is released turning off the switch it controls and, consequently, causing the waveform G to drop back to the off state. This in turn resets the flip flops 71, 75 and 80 and the binary counter 77 so that they are ready to begin the information reading cycle on the next container 10 presented.

Figure 6:
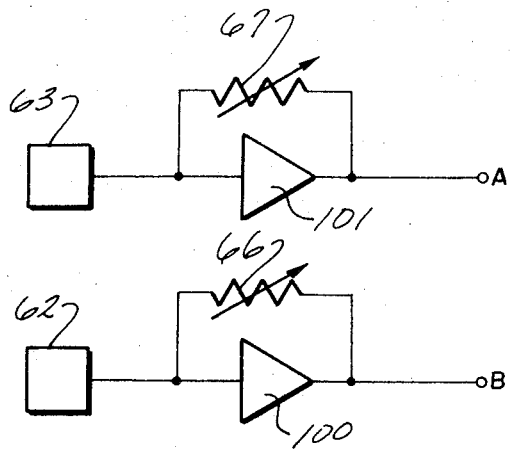
FIG. 6 is a schematic circuit diagram of the ambient light compensating arrangement with the photocell pickups.

The read photocells 62 and 63 are subjected to some ambient light from the surroundings and to a general level of illumination from the light source 34 during the cavity identification cycle. As best seen in FIG. 6, the output from the read photocells 62 and 63 is amplified by respective amplifiers 100 and 101 to give the waveforms A and B. For the purpose of rendering the system insensitive to ambient light, or to increase the signal-to-noise ratio, a pair of balancing photocells 66 and 67 may be employed with their surfaces exposed to ambient light levels. The balancing photocells 66 and 67 are shown as variable resistors in a feedback loop around the amplifiers 100 and 101. The overall gain of the amplifiers 100 and 101 is a function of these feedback resistances. The balancing photocells 66 and 67 have a long response time relative to the read photocells 62 and 63; thus, the shadows of the images of the machine readable protuberances such as, for example, the protuberance 52, will have no significant effect on the balancing photocells 66 and 67. However, as the overall light level falling on the read-out unit 48 decreases, the resistance of the balancing photocells 66 and 67 will rise, causing an increase in the gain of the amplifiers 100 and 101. Conversely, an increased overall light level will decrease the resistance of the balancing photocells 66 and 67 and consequently, reduce the gain of the amplifiers 100 and 101. The net result is to preserve a relatively constant level of contrast between the overall light level falling on the read-out unit 48 as sensed by the read-out photocells 62 and 63 and the shadows produced by the images of the machine readable protuberances as sensed by the read-out photocells 62 and 63. This maintains the waveforms A and B at relatively constant values.

While the inclusion of the balancing photocells is advantageous to the operation of the system, it should be apparent that the system will function without this addition.

We claim:

1. A method for identifying the mold origin of non-opaque containers produced in a plurality of molds comprising the steps of:
   a. molding identification indicia into each of said containers, unique for each of said plurality of molds, and having distinctive light scattering properties such that a projected image of the portion of said container on which said indicia appears presents a distinctive pattern of dark spots;
   b. moving a container to be identified as to its mold of origin into an identification station;
   c. illuminating said indicia of said container with a light beam at said identification station;
   d. projecting the light transmitted through said container onto an image plane to produce said distinctive pattern of dark spots on said image plane;
   e. electronically reading said pattern of dark spots on said image plane to provide an output representative of said pattern of dark spots; and
   f. decoding said output to identify the mold of origin of said container.

2. The method of claim 1 further comprising optically rotating said transmitted light on said image plane while said container is held stationary in said identification station.

3. The method of claim 1 further comprising presenting the decoded mold identification of each container in the form of a digital output.

4. Apparatus for identifying which of a plurality of molds produced a particular non-opaque container, wherein said containers have integrally molded therein light scattering identifying indicia such that an image of the portion of said container on which said indicia appears presents a distinctive pattern of dark spots, comprising an identification station to accept said containers one at a time, means for conveying said containers in single file to said identification station, means for holding said containers at said identification station, means for illuminating with light said identifying indicia, means for projecting the image of said indicia, means for intercepting the projected image of said indicia to thereby define an image plane, said means for projecting the image of said indicia being located intermediate said container and said image plane, means at said image plane responsive to said dark spots, and means for decoding said identifying indicia appearing as said dark spots on said image plane.

5. The apparatus of claim 4 further comprising means connected to said decoding means for digitally displaying said decoded identifying indicia.

6. The apparatus of claim 4 further comprising means intermediate said container and said image plane for optically rotating said image of said indicia on said image plane while said container is held stationary.

7. The apparatus of claim 6 wherein said means for rotating said image includes a rotating dove prism disposed between said image plane and said container.

8. The apparatus of claim 4 further comprising means in said image plane connected to said decoding means for automatically compensating for ambient light falling on said means responsive to said dark spots.

9. The apparatus of claim 8 wherein said means for automatically compensating for ambient light falling on said image plane includes photocells sensitive to the general level of illumination falling on said photocells.

10. The apparatus of claim 4 wherein said means responsive to said dark spots includes photocells located in said image plane.

* * * * *

UNITED STATES PATENT OFFICE
CERTIFICATE OF CORRECTION

Patent No. 3,745,314          Dated July 10, 1973

Inventor(s) BENNY B. MATHIAS and JAMES R. SAGER

It is certified that error appears in the above-identified patent and that said Letters Patent are hereby corrected as shown below:

Col. 2, line 12, "parituclar" should be ---particular---.
Col. 7, line 8 (claim 1), after "mold" insert ---of---.

, Signed and sealed this 20th day of November 1973.

(SEAL)
Attest:

EDWARD M. FLETCHER, JR.          RENE D. TEGTMEYER
Attesting Officer          Acting Commissioner of Patents